(12) United States Patent
Kaplun

(10) Patent No.: US 6,543,559 B1
(45) Date of Patent: Apr. 8, 2003

(54) VEHICLE PROPULSION SYSTEM

(76) Inventor: Gregory Kaplun, 2448 Pennsylvania St., Allentown, PA (US) 18104

( * ) Notice: Subject to any disclaimer, the term of this patent is extended or adjusted under 35 U.S.C. 154(b) by 0 days.

(21) Appl. No.: 09/619,402

(22) Filed: Jul. 19, 2000

(51) Int. Cl.[7] .......................... B62D 57/00; B62D 61/10
(52) U.S. Cl. .......................... 180/7.1; 180/23; 180/252; 180/65.5; 301/5.1
(58) Field of Search .......................... 180/7.1, 8.3, 7.2, 180/10, 21, 65.1, 233, 218, 208, 337, 906, 20, 22, 23, 24.03, 24.07, 24.08, 65.5; 301/5.1, 1; 152/5

(56) References Cited

U.S. PATENT DOCUMENTS

| | | | |
|---|---|---|---|
| 2,967,580 A | * | 1/1961 | Aghnides |
| 3,043,391 A | * | 7/1962 | Aghnides .................. 180/7.1 |
| 3,655,005 A | * | 4/1972 | Chicurel .................. 180/7.1 |
| 3,695,375 A | * | 10/1972 | Splawinski ................ 180/29 |
| 4,274,502 A | * | 6/1981 | Somerton-Rayner ........ 180/6.2 |
| 4,353,428 A | * | 10/1982 | Kovar et al. ............... 301/1 |
| 4,664,208 A | * | 5/1987 | Horiuchi et al. ........... 180/23 |
| 4,785,899 A | * | 11/1988 | Von Winchelmann ....... 180/7.1 |

FOREIGN PATENT DOCUMENTS

| | | | | |
|---|---|---|---|---|
| DE | 1655461 | * | 11/1977 | ................ 180/7.1 |
| FR | 2473423 | * | 7/1981 | |
| GB | 2172558 | * | 9/1986 | ................ 180/7.1 |
| JP | 0060478 | * | 3/1989 | ................ 180/7.1 |
| SU | 0876493 | * | 11/1981 | ................ 180/7.1 |

* cited by examiner

Primary Examiner—Anne Marie Boehler
(74) Attorney, Agent, or Firm—Cheryl R. Figlin

(57) ABSTRACT

A propulsion system for a vehicle comprised of two wheels, both of which are in the shape of hemispheres. Each of the hemisphere wheels is mounted through a bearing on a fork with two pivots attached to the inner race of the bearing, allowing the wheel to rotate around two perpendicular accesses. The center of each wheel is attached to the shaft through a double universal joint or a flexible shaft. By rotating the hemisphere wheel around the fork pivots the diameter of the wheel engaged with the ground is increased or decreased allowing the vehicle speed and/or direction to very.

15 Claims, 5 Drawing Sheets

VEHICLE PROPULSION SYSTEM

BACKGROUND OF THE INVENTION

Propulsion systems for vehicles in use today consist of wheels, tracks and, in rare cases, worms or legs. They are very efficient devices, but are incapable of automatically changing the speed of a vehicle without changing gears of the transmission or the speed of the motor. Most power sources can operate only over small speed range with good economy and power. As a result, a large number of gear changes are required for efficient operation. The present automatic and manual transmissions in use attempt to maximize operating economy and power through a constant maintenance of power source rotational speed at the top of the power curve. These transmissions do not have high efficiency or smooth operation because they must have stepped speed ratio changes. Existing designs for continuously variable transmission lack efficiency, simplicity of operation, power transmission capability or operating speed range.

Turning one or two pairs of wheels through a complicated linkage system or pivoting the front of the vehicle against the rear commonly accomplishes the change of direction for wheeled vehicles. For vehicles on tracks or worms it is done through braking or reversing the track or worm on one side.

In all cases existing systems consist of either a complicated mechanical arrangement, resulting in high cost and maintenance, or require substantial expenditure of available power, decreasing operating efficiency.

SUMMARY OF THE INVENTION

The object of this invention is an improved vehicle's propulsion system. The proposed propulsion system takes advantage of the fact that a wheel in the shape of a hemisphere rotating around its polar axis has larger length of circumference at its major diameter than close to its tip. The radius of a hemisphere is a constant, therefore the transition from the major diameter to a minor diameter produces step less length of circumference change without changing the point of engagement between the hemisphere wheel and the ground. The hemisphere wheel on each side of the vehicle thus would be mounted on the bearing. The inside race of the bearing would have two pivot points inside the hemisphere's major diameter allowing the wheel to swing around a mounting fork. The fork is attached to the body of the vehicle or is a part of the suspension. The center of the hemisphere wheel would be connected to the driving shaft through a constant velocity device (double universal joint, flexible shaft or similar). Alternatively, each wheel can have a motor mounted on the inside race of the bearing, the shaft of the motor is then connected to the hemisphere wheel. A control lever would have a joint attachment to the inner race of the wheel bearing, perpendicular to the pivot points. Movement of the control lever would swing the hemisphere wheel around the pivot points, changing the diameter of the wheel engaged with the ground. The positions of the control levers would thus determine the vehicles speed and/or direction. By tilting the pair of hemisphere wheels in opposite directions against the pivot points of the corresponding mounting forks, the vehicles speed would be increased or decreased.

A unidirectional swing of the pair of wheels would produce a vehicles change of direction. A four-wheel vehicle can have one pair of hemisphere wheels and another pair of regular wheels or, for increased mobility, two pairs of hemisphere wheels. By swinging one pair of hemisphere wheels in opposite direction from the second pair the front and rear of the vehicle would be directed in opposite directions thus producing an extremely small turning radius. A vehicle can have multiple pairs of hemisphere wheels. The control levers for a pair of hemisphere wheels can be separate, individually controlling each wheel, or joined, primarily for directional control, or have both joined and individual control, allowing for multiple control schemes of speed and direction.

It is therefore an object of the present invention to provide an improved vehicle's propulsion system which can be easily and economically produced, simple in principal, convenient in operation, sturdy in construction, highly efficient, long lasting and capable of operating under wide range of power and speed.

BRIEF DESCRIPTION OF THE DRAWINGS

In the accompanying drawings forming a material part of the description, there is shown.

DETAILED DESCRIPTION OF THE PREFERRED EMBODIMENT

Figure 1:
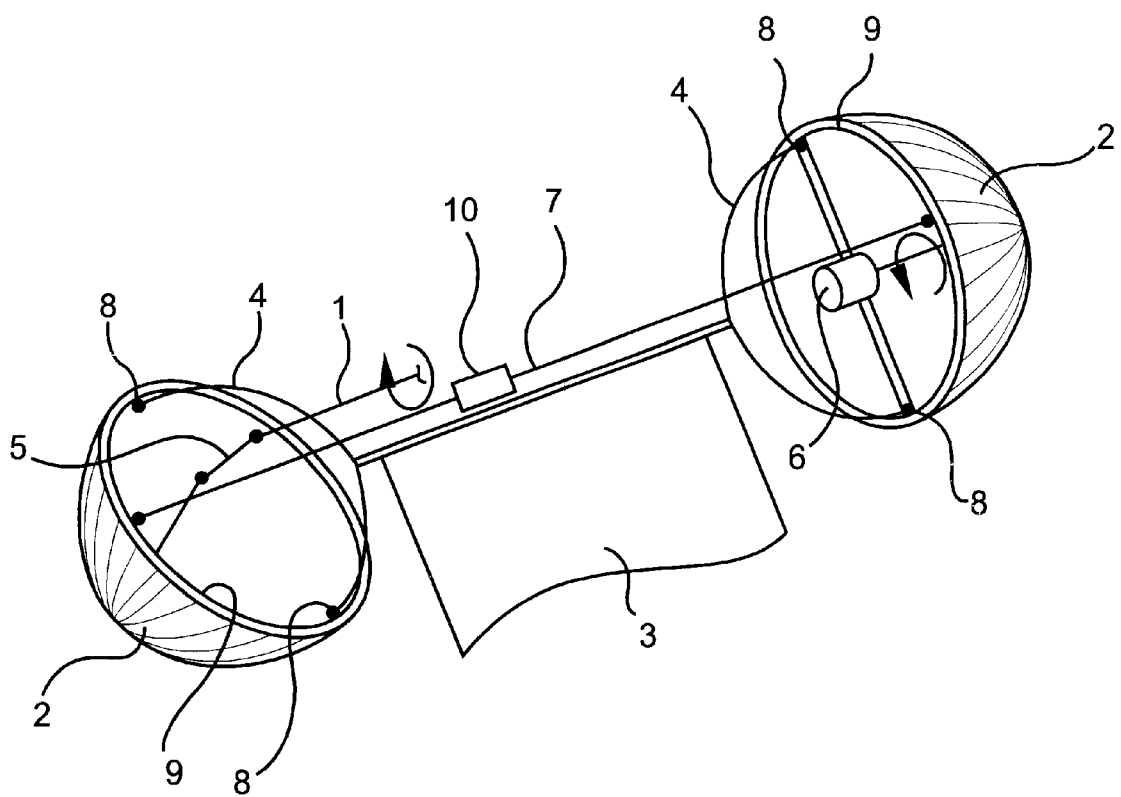
FIG. 1 shows a perspective'view of the pair of hemisphere wheels employed as a propulsion system.
Figure 2:
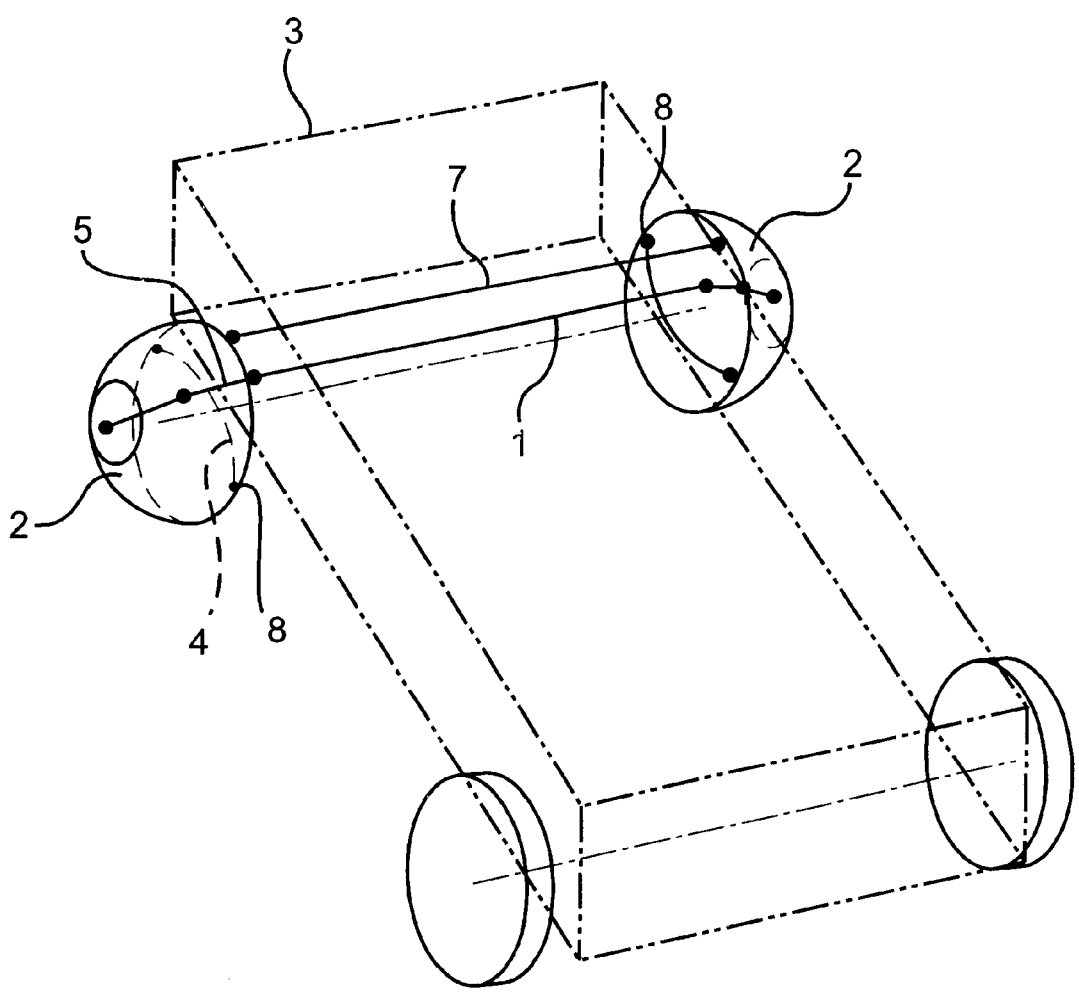
FIG. 2 shows a vehicle having a pair of hemisphere wheels in the front and a pair of regular wheels in the back.

Referring to the FIG. 1, there is shown a first embodiment of the vehicle's propulsion system comprised of a pair of hemisphere wheels where input shaft 1 is connected to the hemisphere wheel 2 through a double universal joint 5, flexible shaft 12 or a similar constant velocity device. The hemisphere wheel is rotating on the bearing 9, the inner race of the bearing having two pivot points 8, attached to the mounting fork 4. The bearing 9 is located at the major diameter of the hemisphere wheel. However, as is well known in the art, the bearing can be in a number of places on the hemisphere wheel and is only a matter of design. The fork is attached to the body of the vehicle 3 or is a part of the suspension (not shown). The fork 4 can be attached directly to the hemisphere wheel or, as well known in the art can have an intermediate member connecting the fork to the hemisphere wheel. The control lever 7 determines the angle between the hemisphere wheel and the input shaft. The lever is connected to the inner race of the bearing 9 through a pivot joint, and the lever 7 is connected to a control lever controller 10. The hemisphere wheels are engaged through friction with the ground. As input shaft 1 is being driven by an outside source of power such as an engine or a motor, it is rotating the hemisphere wheel 2 with the same speed as the shaft through a constant velocity device 5. The speed of the wheel is the same as the input shaft regardless of the angle between the wheel and the shaft.

Each wheel can also be rotated by a motor 6 mounted on the inside race of the bearing, the shaft of the motor is then connected to the hemisphere wheel. The control lever 7 is operated by an unspecified positioning device, such as, for example, a hydraulic cylinder or a pneumatic cylinder or an actuator. It can, also, be controlled manually. The position of the control lever 7 is determining the angle between the wheel 2 and the shaft 1. When this angle is equal zero (the hemisphere wheel 2 and the shaft 1 are rotating on the same axis), the hemisphere wheel is engaged with the ground at its major diameter. The speed in this position is the highest allowed by the wheels diameter. When the control lever 7 turns the hemisphere wheel around pivot points 8 to a maximum angle allowed by the constant velocity device 5, the hemisphere wheel is engaged with the ground at it's minor diameter. The vehicles speed in this position is the lowest allowed by the wheels diameter. Due to the fact that the pivot points 8 lay on the diameter of the hemisphere wheel, the engagement point between the wheels and the ground being at the radius distance from the pivot points does not change regardless of the angle between the hemisphere wheel and the input shaft. By tilting the pair of hemisphere wheels in opposite directions against the pivot points of the corresponding mounting forks, the vehicles speed would be increased or decreased. A unidirectional swing of the pair of wheels would produce a vehicles change of direction. If two wheels 2 are driven by the same shaft 1 and controlled by the same control lever 7, as the control lever 7 is moved to one side, the wheel in this direction is turned to contact the ground with the smaller diameter. At the same time the wheel on the opposite side is turned to contact the ground with the larger diameter, producing a turning motion of the vehicle.

Figure 3:
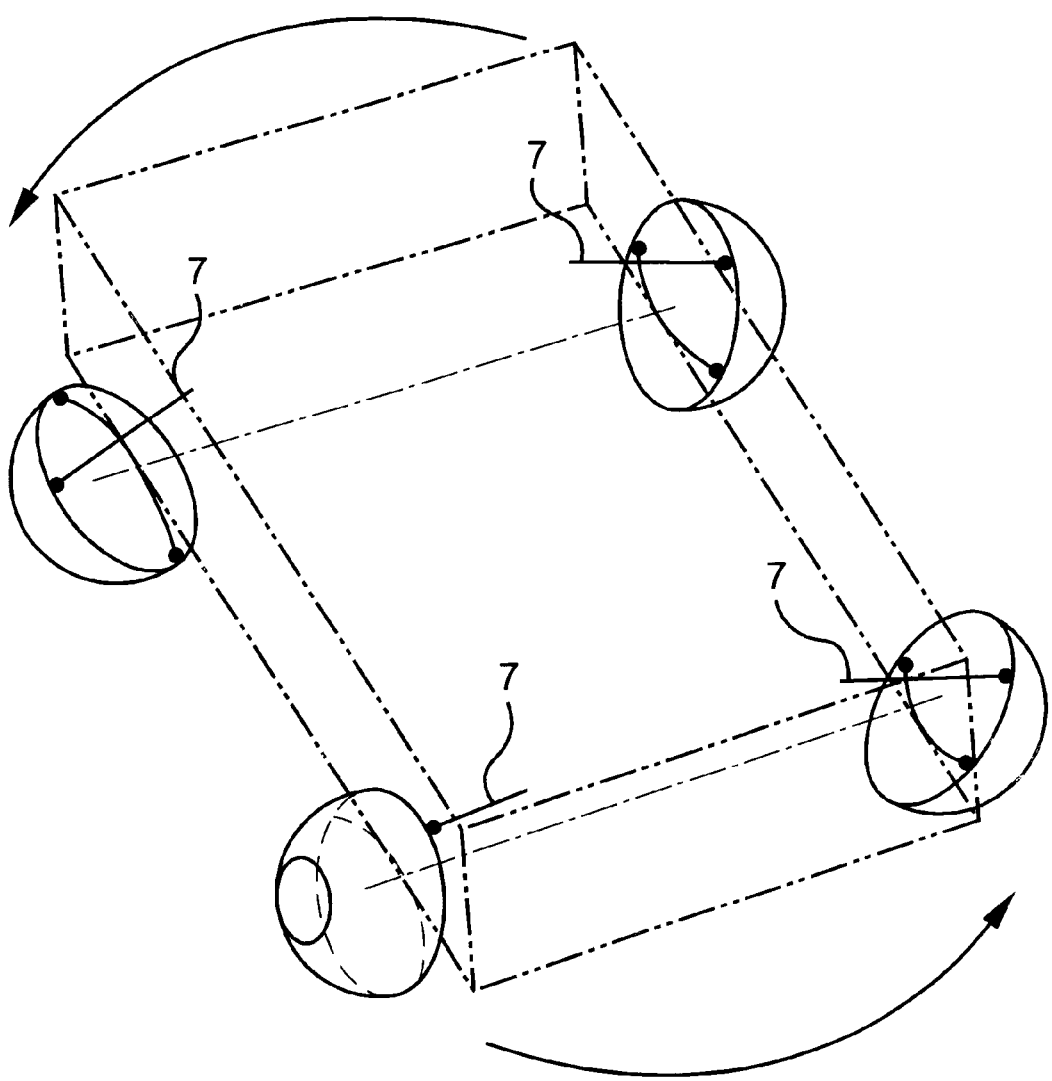
FIG. 3 shows a vehicle having two pairs of hemisphere wheels.
Figure 4:
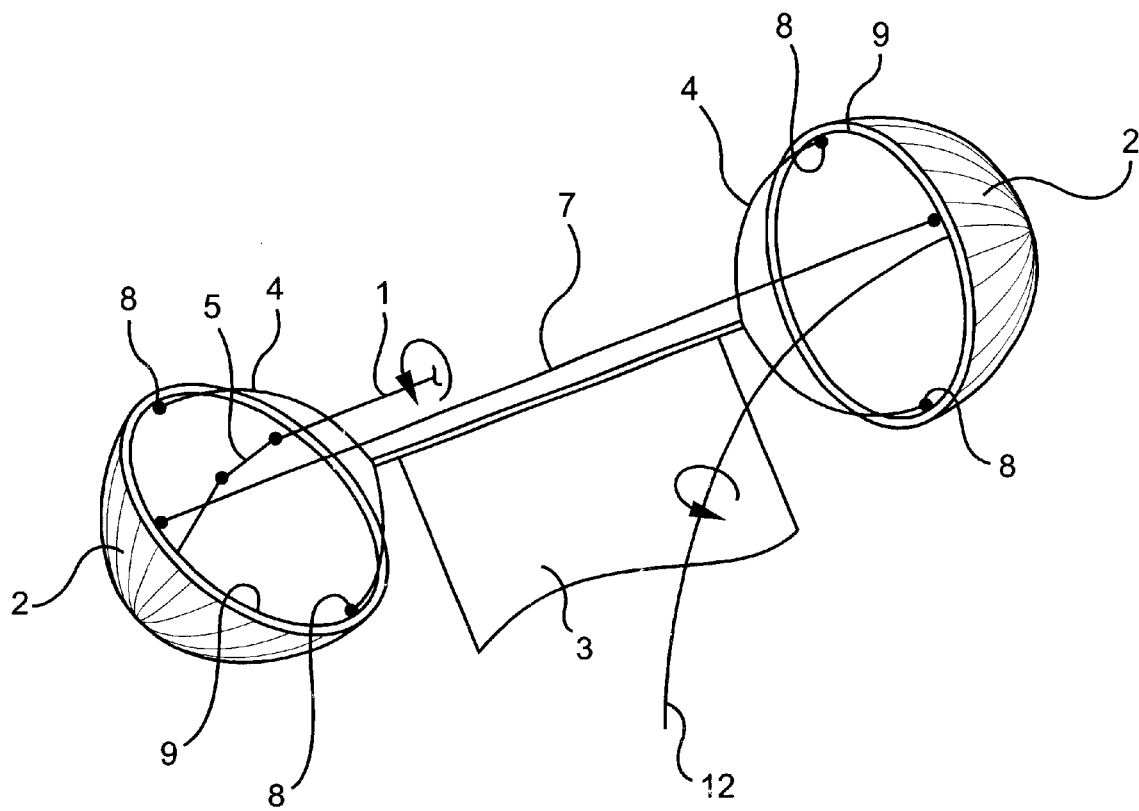
FIG. 4 shows a perspective view of the pair of hemisphere wheels employed as a propulsion system with a flexible shaft.
Figure 5:
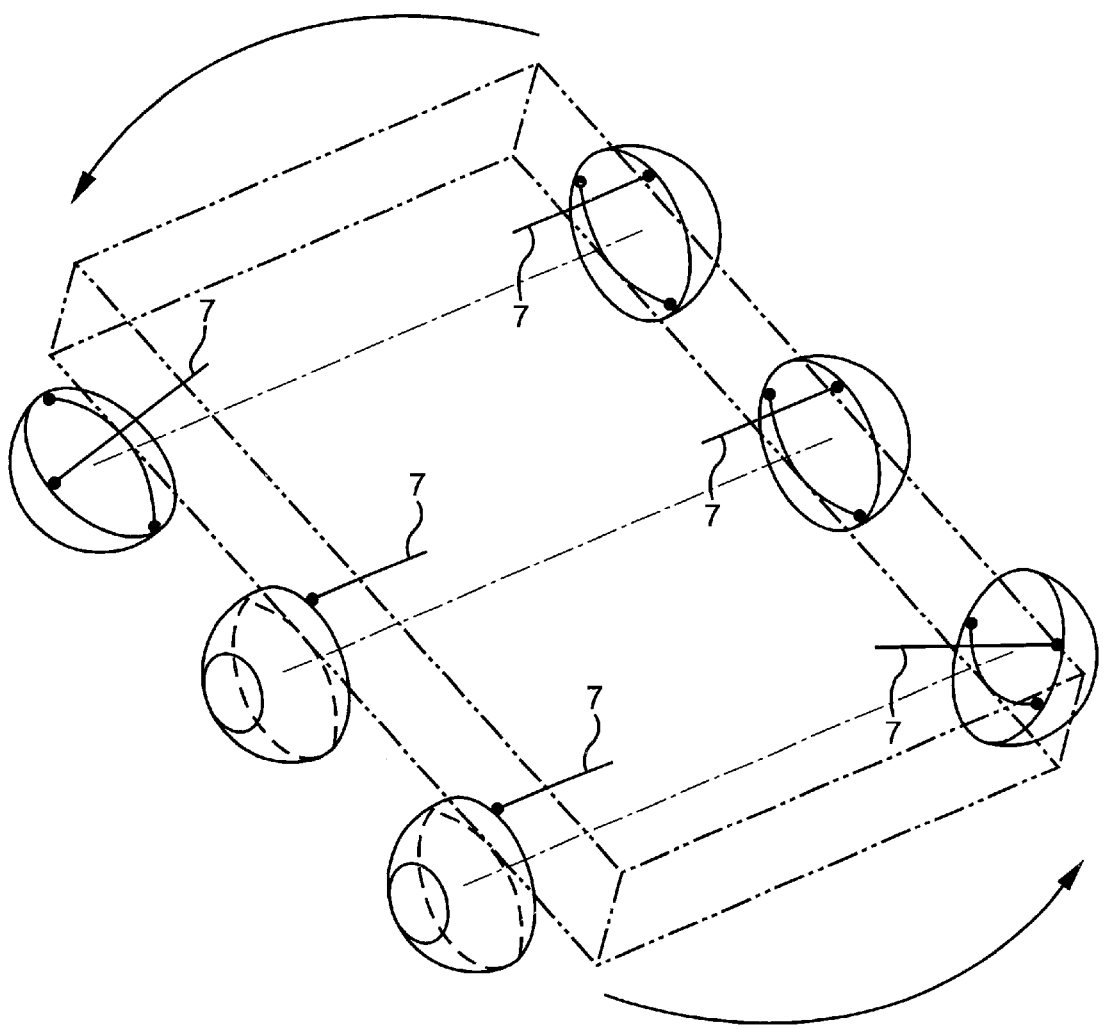
FIG. 5 shows a vehicle having three pairs of hemisphere wheels.

Referring to the FIG. 3, this embodiment of the present invention's propulsion system is showing two pairs of hemisphere wheels on a four-wheel vehicle. Four control levers 7 determine the position of each hemisphere wheel separately.

Due to the basic nature of the invention, many modifications, variations and different applications are possible without departing from the spirit and scope of the above-described embodiments of the invention.

What is claimed is:

1. A propulsion system for a vehicle comprising:

first and second hemisphere wheels;

an input means connected to said first hemisphere wheel;

said first hemisphere wheel having a first bearing located on an inside circumference of the first hemisphere wheel;

a housing having a first mounting fork attached to said first hemisphere wheel at two pivot points located at the first hemisphere wheels diameter;

a control lever having a joint attachment to an inner race of the first bearing, parallel to a pivot axis defined by the pivot points of the first mounting fork;

said control lever also being attached to an inner race of a second bearing, parallel to the pivot axis of the pivot points of a second mounting fork of a second hemisphere wheel;

said second hemisphere wheel having said second bearing located on the inside circumferences of the second hemisphere wheel;

the housing having a second mounting fork attached to said second hemisphere wheel at two pivot points located at the second hemisphere wheels diameter;

an outer circumference of said first and second hemisphere wheels being engaged through friction with the ground;

said control lever having the ability to swing both hemisphere wheels around the pivot points of the mounting forks to change the engaged diameters of both of the hemisphere wheels.

2. The propulsion system of claim 1, wherein the first bearing is located on the inside circumference of the first hemisphere wheel at the hemispheres diameter, and the first two pivot points are located on the first inner race of said bearing, and the second bearing is located on the inside circumference of the second hemisphere wheel at the hemispheres diameter, and the second two pivot points are located on the inner race of said second bearing.

3. The propulsion system for a vehicle of claim 1, wherein the system is used as a vehicle's front wheels.

4. The propulsion system for a vehicle of claim 1, wherein the system is used as a vehicle's rear wheels.

5. The propulsion system for a vehicle of claim 1, wherein the system is used as both the front and back wheels of a vehicle, such that there are four hemisphere wheels in sets of two and one control lever for each set of two hemisphere wheels.

6. The propulsion system for a vehicle of claim 1, wherein the control lever is controlled by one of the following:

a. an hydraulic cylinder, or b. a pneumatic cylinder, or c. an actuator, or d. manually.

7. The propulsion system for a vehicle of claim 1, wherein a vehicle can have multiple pairs of hemisphere wheels.

8. The propulsion system for a vehicle of claim 7, wherein the multiple pair of hemisphere wheels is three or more pairs of hemisphere wheels.

9. The propulsion system for a vehicle of claim 1, wherein the input means comprising an input shaft wherein said input shaft is a flexible constant velocity device connected to said first hemisphere wheel on an inside center of said first hemisphere wheel.

10. The propulsion system for a vehicle of claim 9, wherein the flexible constant velocity device is a double universal joint.

11. The propulsion system for a vehicle of claim 9, wherein the flexible constant velocity device is a flexible shaft.

12. The propulsion system for a vehicle of claim 9, wherein the input means is an engine or a motor connected to the input shaft.

13. The propulsion system for a vehicle of claim 1, wherein the input means is a motor mounted on the inner race of the bearing of the first hemisphere wheel.

14. The propulsion system for a vehicle of claim 13, wherein both the first and second hemisphere wheels have a motor mounted on the inner race of the bearings, such that the first and second hemisphere wheels will have independent input means from each other.

15. The propulsion system for a vehicle of claim 5, wherein the input means is a motor mounted on the inner race of the bearings of all four hemisphere wheels of the system, such that the first, second, third and fourth hemisphere wheels will have independent input means from each other.

* * * * *